United States Patent [19]
Hu

[11] Patent Number: 5,938,769
[45] Date of Patent: Aug. 17, 1999

[54] CPU ESCALATING ADAPTER WITH MULTIVOLTAGE AND MULTIPLE FREQUENCY SELECTION

[75] Inventor: Ta-Shin Hu, Taipei, Taiwan

[73] Assignee: Friendtech Computer Co., Ltd., Taipei, Taiwan

[21] Appl. No.: 08/845,149

[22] Filed: Apr. 21, 1997

[51] Int. Cl.⁶ .................................................. G06F 1/00
[52] U.S. Cl. ............................................................. 713/300
[58] Field of Search ................................ 395/750.01, 500, 395/309, 882; 713/300; 710/129, 62

[56] References Cited

U.S. PATENT DOCUMENTS

| 4,390,963 | 6/1983 | Puhl et al. ............................ | 395/309 |
| 5,384,692 | 1/1995 | Jaff ...................................... | 361/807 |
| 5,659,690 | 8/1997 | Stuber et al. ........................ | 395/309 |
| 5,675,772 | 10/1997 | Liu et al. ............................ | 395/500 |

OTHER PUBLICATIONS

80486 VL Turbo Main Board, User's Manual, pp. 1–4 and 1–8 to 1–10, Aug. 8, 1995.

*Primary Examiner*—Ayaz R. Sheikh
*Assistant Examiner*—Xuong Chung-Trans
*Attorney, Agent, or Firm*—Foley & Lardner

[57] ABSTRACT

A CPU escalating adapter with multivoltage and multiple frequency selection which is adapted for an escalated CPU is disclosed. The CPU escalating adapter comprises a circuit board, a power connection, a voltage regulator, a stabilivolt integrated circuit, a programmable array logic (PAL) and a toggle switch member. The cooperation of the toggle switch member and the voltage regulator forms a multiple voltage switching and a plurality of switches of the toggle switch member forms a selecting range between 2 and 5.5 of the frequency multiplication factor of the CPU.

4 Claims, 3 Drawing Sheets

CPU ESCALATING ADAPTER WITH MULTIVOLTAGE AND MULTIPLE FREQUENCY SELECTION

BACKGROUND OF THE INVENTION

1. Field of the Invention

The present invention relates to a CPU escalating adapter with multivoltage and multiple frequency selections, and more particularly to a CPU escalating adapter with multivoltage and multiple frequency selections which is adapted for an escalated CPU, without replacing a host.

2. Description of Related Art

An early PENTIUM CPU uses a power supply of 5 volts and operates at a frequency of 60 and 66 Mhz. However, this chip has disadvantages of large size and high cost, since a significant power loss may occur and a 0.5 micrometer process is adopted. As a result, an improved PENTIUM CPU with a frequency more than 75 mhz, a 0.35 micrometer process and a voltage of 3.3 volts is developed. This improved PENTIUM CPU has a shortened appearance substantially the same as a 486 computer CPU and the power consumption thereof is reduced. However, an early design of a host of this kind of CPU only supports a single voltage and a frequency multiplication factor between 1.5 and 2, so that it is only adapted for the CPU with frequency between 75 Mhz and 133 Mhz. Therefore, the host of the CPU can not be escalated to use frequency between 166 Mhz and 366 Mhz due to the limitation of the frequency multiplication factor. To solve this problem, the host needs to be eliminated. Later, a kind of host supporting the frequency multiplication factor of 3 is disclosed. Though this kind of host is adapted for a CPU with frequency of 200 Mhz, it still can not be used for a new PENTIUM CPU (with multimedia instruction set) or an AMD K6 and CYRIX M2 CPU due to the limitation of supporting a single voltage of the host.

The present invention provides an improved CPU escalating adapter with multivoltage and multiple frequency selections to mitigate and/or obviate the aforementioned problems.

SUMMARY OF THE INVENTION

One object of the present invention is to provide a CPU escalating adapter with multivoltage and multiple frequency selection which is adapted for an escalated CPU, without replacing a host.

Another aspect of the present invention is to provide a CPU escalating adapter with multivoltage and multiple frequency selection which is adapted for not only the CPU with single voltage, but also the CPU with multivoltage.

A third object of the present invention is to provide a CPU escalating adapter with multivoltage and multiple frequency selection which provides a selecting range between 2 and 5.5 of the frequency multiplication factor.

In accordance with one aspect of the present invention, a CPU escalating adapter with multivoltage and multiple frequency selection comprises a circuit board defining a plurality of recesses for receiving the CPU and having a plurality of pins extending downwardly therefrom to be inserted into a CPU socket of the computer host; a power connection disposed at one side of the circuit board; a voltage regulator composed of a plurality of switches divided into groups for controlling the voltage regulator and frequency multiplication factors.

In accordance with another aspect of the present invention, the voltage regulator comprises a regulator and a stabilivolt integrated circuit for modifying a reference input voltage of the stabilivolt integrated circuit and a supply voltage via switching a toggle switch member.

In accordance with a further aspect of the present invention, an input for inputting the reference voltage of the stabilivolt integrated circuit is connected to the toggle switch member via a divider resistor for changing a negative feedback of the divider resistor by switching the toggle switch member.

In accordance with the present invention, the toggle actuator has a plurality of switches connected with an input of multiple frequency selection of the CPU for providing a function of selecting frequency multiplication factors.

In accordance with still a further aspect of the present invention, the CPU escalating adapter with multivoltage and multiple frequency selection further includes a programmable array logic (PAL) for converting a part of control signals of the CPU.

Other objects, advantages and novel features of the invention will become more apparent from the following detailed description when taken in conjunction with the accompanying drawings.

DETAILED DESCRIPTION OF PREFERRED EMBODIMENT

Figure 1:
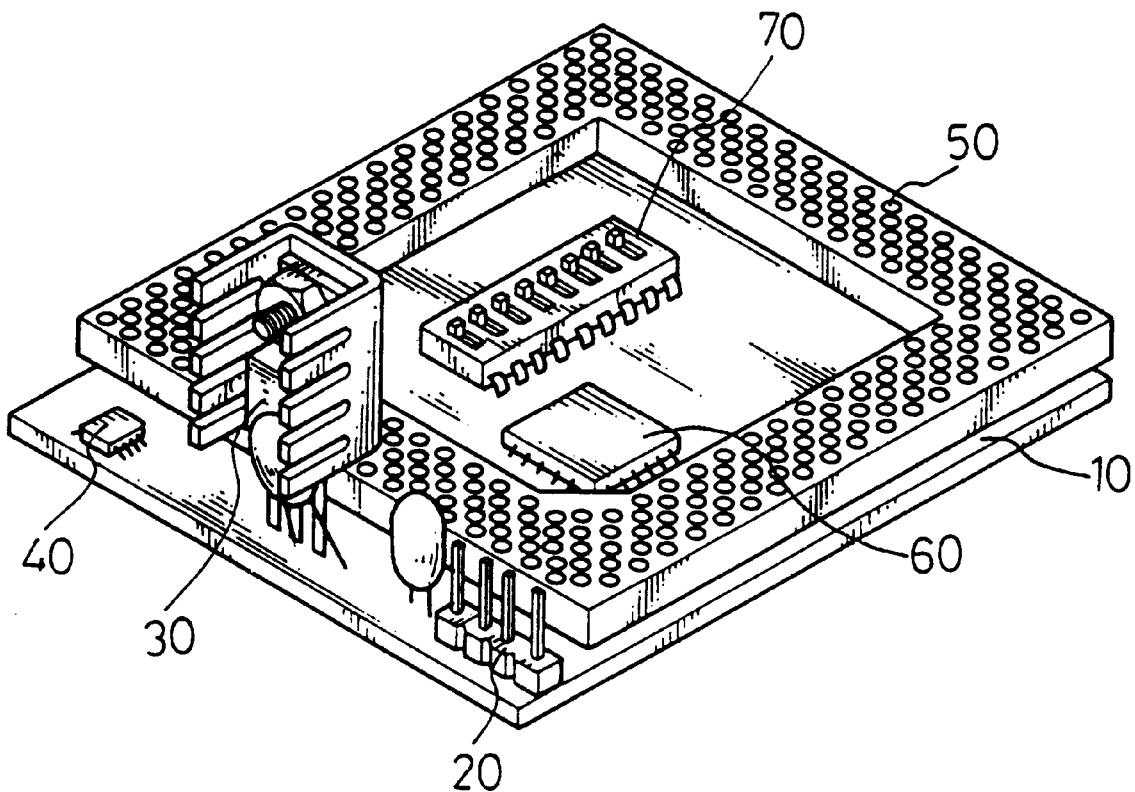
FIG. 1 is a perspective view showing a CPU escalating adapter with multivoltage and multiple frequency selection in accordance with the present invention.

Referring to FIG. 1, the CPU escalating adapter with multivoltage and multiple frequency selection in accordance with the present invention comprises a circuit board 10, a power connection 20 disposed at one side of the circuit board 10, a voltage regulator 30, a stabilivolt integrated circuit 40, a programmable array logic (PAL) 60 and a toggle switch member 70. The circuit board 10 defines a plurality of recesses 50 for receiving a CPU 80 (see FIG. 2) and has a plurality of pins (not shown and not numbered) extending downwardly therefrom to be inserted into a computer host.

Figure 2:
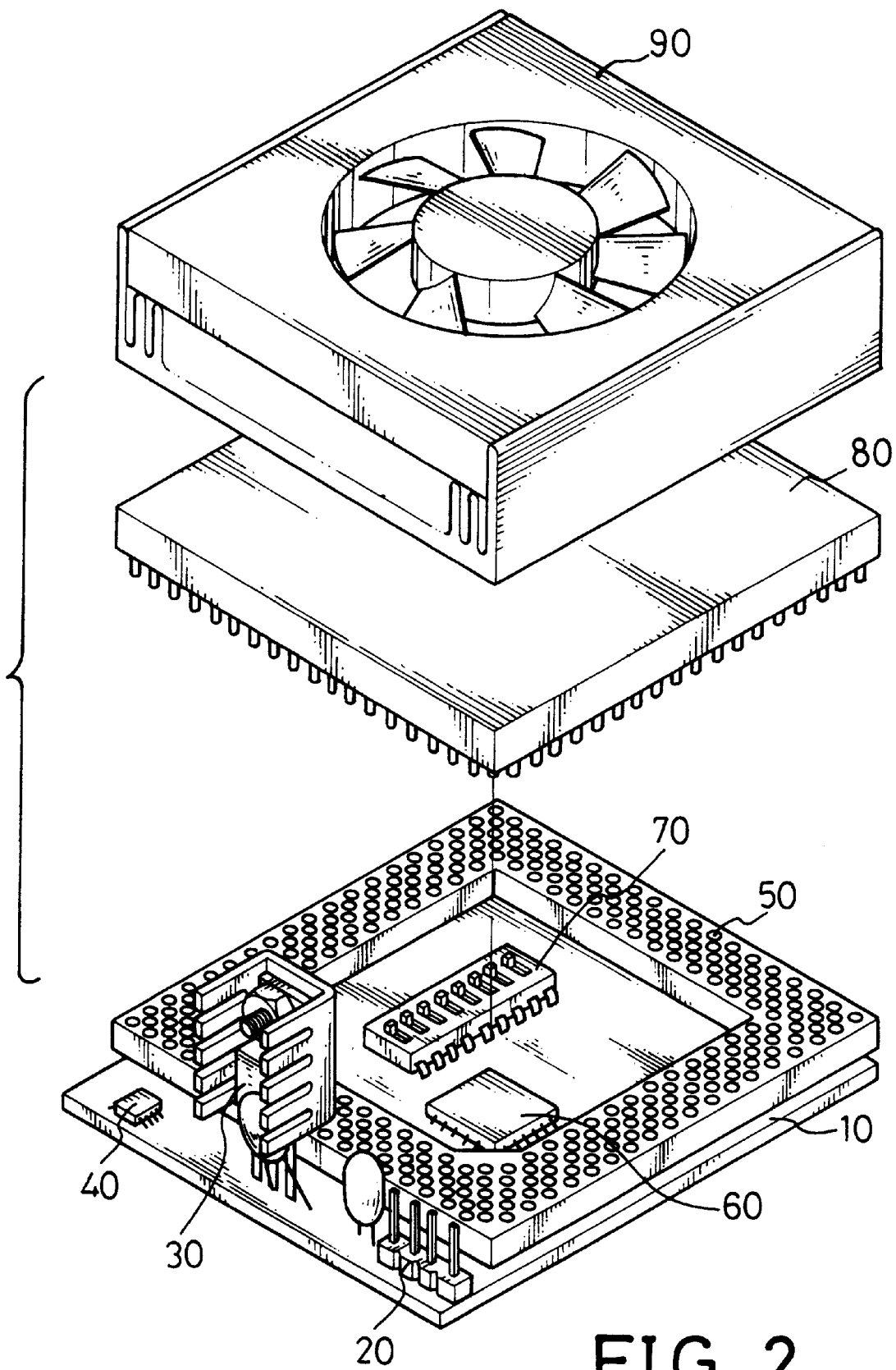
FIG. 2 is a schematic view showing the combination of a CPU, a radiating fin and the CPU escalating adapter in accordance with the present invention.

In assembly, referring to FIG. 2, the CPU 80 to be escalated is firstly engaged with the CPU escalating adapter via a plurality of CPU pins respectively being inserted into the recesses 50 of the circuit board 10. Then a radiating fin 90 is mounted onto the CPU in a conventional manner. Finally, the power connection 20 is coupled with a CPU power source of the computer host.

The toggle switch member 70 comprises a plurality of switches and is located on a center of the circuit board 10 for selecting frequency multiplication factors or different multivoltage values by switching each switch in order to be adapted for a new CPU with high speed.

Figures 3, 4:
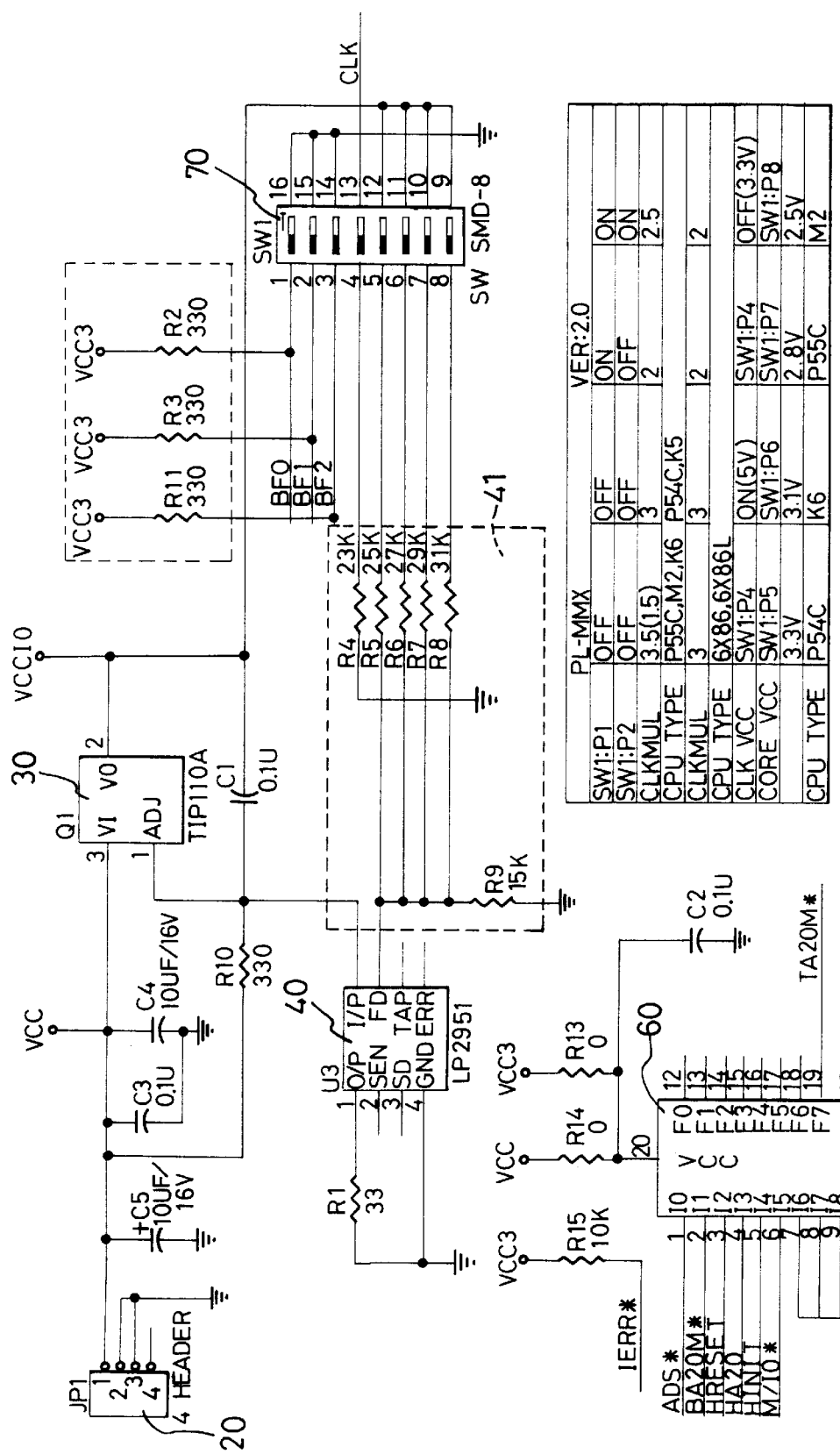
FIG. 3 is a circuit diagram of the CPU escalating adapter with multivoltage and multiple frequency selection in accordance with the present invention.
FIG. 4 is a graph diagram showing the setting of a toggle switch member of the CPU escalating adapter in accordance with the present invention.

Referring to FIG. 3, the power connection 20 is connected to the voltage regulator 30. At two ends of the voltage regulator 30, VCC and VCC10 respectively form two sets of power supply. The power supply VCC directly input by the power connection 20 is a CPU voltage output by the computer host, while the power supply VCC10 is formed by switching the toggle switch member 70 a voltage which varies between 2.5 volts and 3.3 volts in order to provide voltage to the CPU core with double power supplies. An adjusting end (ADJ) of the voltage regulator 30 is connected to the stabilivolt integrated circuit 40. A reference voltage input end (FD) is connected to the voltage output end (VCC10) via a divider resistor 41 and a fifth to eighth switch of the toggle switch member 70.

With the combination of the voltage regulator 30, the stabilivolt integrated circuit 40, the divider resistor 41 and the toggle switch member 70, output voltage of the voltage regulator 30 can be changed since the toggle switch member 70 forms different negative feedback voltages by switching on and switching off each switch thereof.

When the frequency multiplication factors are to be modified, since a first switch, a second switch, and a third switch of the toggle switch member 70 are directly connected with the bus frequency pins BF0, BF1, and BF2 of the CPU 80, the on-off state of the first, the second, and the third switches determines the state of the frequency multiplication factors of the CPU 80. A fourth switch of the toggle switch member 70 is connected with a clock pin CLK of the CPU 80 for setting the clock power of the CPU 80. The programmable array logic 60 provides conversion of control signals of the CPU 80.

The above mentioned settings of each switch of the toggle switch member 70 are shown in FIG. 4. If a P55C, M2, K6, P54C or K5 model of a CPU is used, there are eight choices of the first switch, the second switch, and the third switch of the toggle switch member 70, which forms a selecting range of frequency multiplication factors from 2.5 to 5.5. The value in the small brackets indicates the frequency multiplication factor of a PENTIUM P54C CPU and an AMD K5CPU. If a CYRIX 6×86 or 6×86L model of CPU is used, the frequency multiplication factors vary between 2 and 3. When the voltage value of the CPU core is to be adjusted, voltage varies between 2.5 volts and 3.3 volts can be obtained by the fifth switch P5, the sixth switch P6, the seventh switch P7 and the eighth switch P8 of the toggle switch member 70 so as to be used for multivoltage CPU with various core voltages.

The voltage regulator includes a plurality of switches divided into groups for controlling the voltage regulator and frequency multiplication factors.

Accordingly, a CPU escalating adapter with multivoltage and multiple frequency selection in accordance with the present invention is adapted for an escalated CPU, without replacing a host. The CPU escalating adapter can be used for not only the CPU with single voltage, but also the CPU with multivoltage. Further, the CPU escalating adapter provides an improved selecting range between 2 and 5.5 of the frequency multiplication factor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A CPU escalating adapter with multivoltage and multiple frequency selection comprising:

a circuit board defining a plurality of recesses for receiving a CPU and having a plurality of pins extending downwardly therefrom to be inserted into a CPU socket of a computer host, said plurality of pins including a plurality of bus frequency pins for determining a frequency multiplication factor for the CPU;

a power connection disposed at one side of the circuit board for supplying power to the CPU escalating adapter;

a voltage regulator disposed on the circuit board for providing a supply voltage to the CPU;

toggle switch member disposed on the circuit board and connected to the voltage regulator and the plurality of bus frequency pins for setting the supply voltage and the frequency multiplication factor for the CPU; and a stabilivolt integrated circuit connected to the voltage regulator, the stabilivolt integrated circuit having a reference voltage input end for receiving a reference input voltage, the reference voltage input end being connected to the toggle switch member whereby the reference input voltage as well as the supply voltage to the CPU is modified by setting the toggle switch member.

2. A CPU escalating adapter with multivoltage and multiple frequency selection as claimed in claim 1, wherein the reference voltage input end of said stabilivolt integrated circuit is connected to the toggle switch member via a divider resistor for changing a negative feedback of the divider resistor by switching the toggle switch member.

3. A CPU escalating adapter with multivoltage and multiple frequency selection as claimed in claim 1, wherein said toggle switch member has a plurality of switches connected with the plurality of bus frequency pins for providing a function of selecting frequency multiplication factors.

4. A CPU escalating adapter with multivoltage and multiple frequency selection as claimed in claim 1, further includes a programmable array logic (PAL) for converting a part of control signals of the CPU.

* * * * *